United States Patent

[11] 3,631,736

[72] Inventor Oliver E. Saari
  Niles, Ill.
[21] Appl. No. 888,633
[22] Filed Dec. 29, 1969
[45] Patented Jan. 4, 1972
[73] Assignee Illinois Tool Works Inc.
  Chicago, Ill.

[54] GEAR TOOTH FORM
  7 Claims, 4 Drawing Figs.
[52] U.S. Cl.................................................. 74/462
[51] Int. Cl.................................................. F16h 55/06
[50] Field of Search......................................... 74/462

[56] References Cited
  UNITED STATES PATENTS

| | | | |
|---|---|---|---|
| 2,031,888 | 2/1936 | Hill............................. | 74/462 |
| 2,091,317 | 8/1937 | Hill............................. | 74/462 |
| 2,230,418 | 2/1941 | Wildhaber.................... | 74/462 |
| 3,251,236 | 5/1966 | Wildhaber.................... | 74/462 |
| 3,371,552 | 3/1968 | Soper........................... | 74/462 |

*Primary Examiner*—Leonard H. Gerin
*Attorneys*—Robert W. Beart, Michael Kovac, Barry L. Clark and Jack R. Halvorsen ABSTRACT: Improved form for the profiles of a pair of mating gears having conjugate gear teeth provides substantially constant relative curvature at each point of contact. A differential equation, as well as a more easily solvable approximate solution for the differential equation is given to enable the path of contact of the pair of gears to be determined. The improved tooth form incorporates the major advantages of involute gearing but is able to take substantially higher loading, requires no undercut for gears having a low number of teeth, and provides more intimate contact. The tooth form may be cut with standard machines but has especial utility in powder metal gears since tooth strength can often be increased sufficiently to permit powder metal gears to replace cut gears.

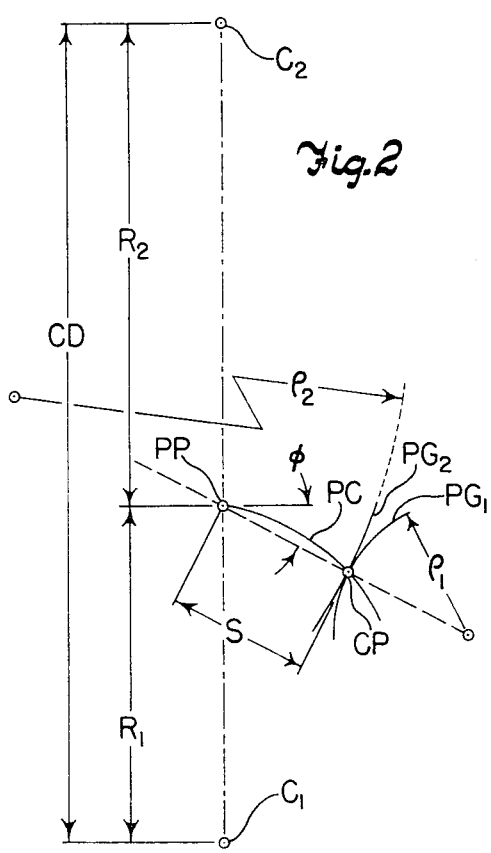
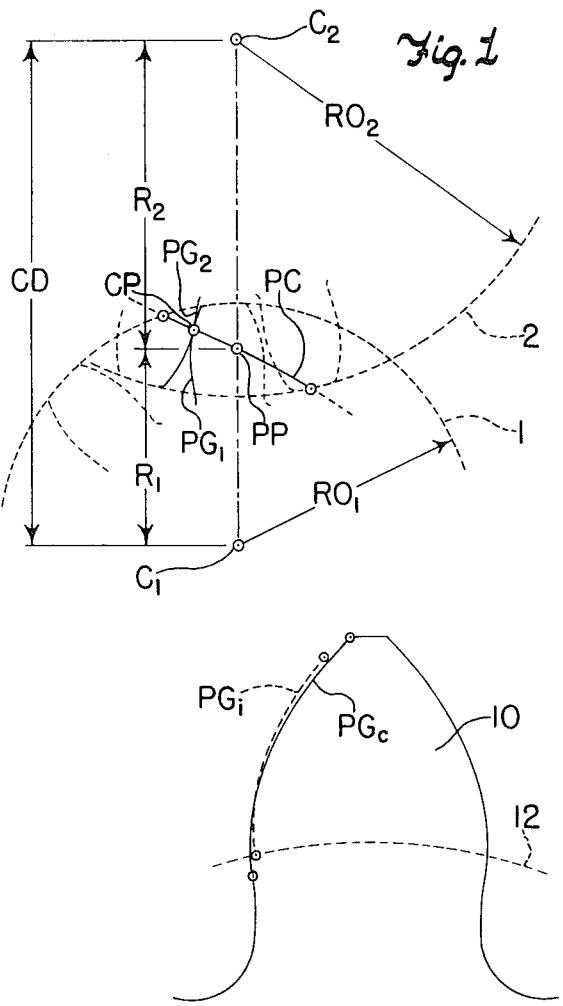
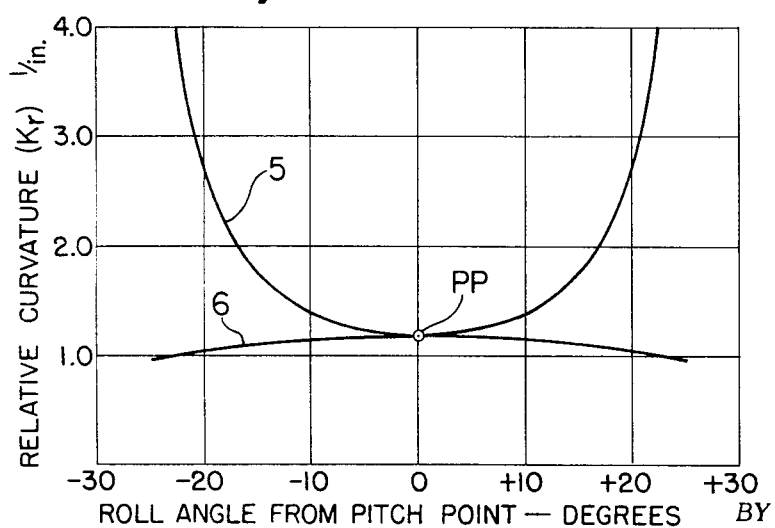
INVENTOR.
Oliver E. Saari

GEAR TOOTH FORM

BACKGROUND OF THE INVENTION

1. Field of the Invention

This invention relates to gearing and particularly to the shape of the tooth profile.

2. Description of the Prior Art

The involute curve as a tooth form for spur and helical gears is almost universally used in modern gear design, because of its very real advantages over the infinite number of other possible forms. The main advantages are as follows:

1. Simplicity of cutting tools, resulting from the straight-sided rack form which is the basis of the involute.

2. Insensitivity of involute gears to errors in mounting center distance. Conjugate action remains theoretically correct in all positions.

3. Basic simplicity of the mathematics involved in designing involute gear teeth, and reliable rating formulas now available, based on a vast amount of test and field usage data.

Today's involute gears carry far more power with greater reliability than was once thought possible. Improvements in material and lubrication and more precise manufacture, made possible by modern equipment, are mainly responsible. Still the search for more strength goes on, as indicated by continuing test programs at many laboratories. As further progress from these standard approaches becomes more and more difficult, it becomes worthwhile to look for a better gear geometry than the involute, as being the only direction in which significant gains can be made.

Many modifications from the involute curve for gears have been tried in the past. Slight modifications such as tip relief and crown have proven their value and are an essential part of the best modern gear design. More radical departures, such as the Wildhaber-Novikov tooth forms, have shown some promise under test conditions; however, the loss of the previously noted three fundamental advantages of the involute form is a serious disadvantage, and none of these designs has received wide acceptance.

The one principal disadvantage of the involute form is the rapidly diminishing radius of curvature of the involute curve in the vicinity of the base circle. At the base circle the radius of curvature becomes zero. The contact stresses (Hertz stresses) between gear teeth become larger as the radii of curvature becomes smaller; in fact, at the base circle the stress would be theoretically infinite. Hence, involute gears should never be designed for contact at or near the base circle. Good design can usually minimize this drawback of the involute geometry; nevertheless, in many highly optimized designs, contact stress is still the principal limitation on load capacity.

Gears of the involute type start to lose part of their active profiles (to "undercut") whenever the generating tool extends below the point where the path of contact touches the base circle. For 20° pressure angle standard depth teeth this occurs at 17 teeth and under. The teeth also become weaker in beam strength. To overcome these difficulties, "long and short addendum" systems are often used. This recourse fails when two gears with low numbers of teeth must run together, as in some planetary arrangements. These modifications also have a detrimental effect when a large gear tends to "overrun", or back-drive its pinion.

That others have considered the possibility of defining gear tooth forms which retain in substance the main advantages of the involute, but avoid the adverse tooth curvature condition, is evidenced by U.S. Pat. Nos. 2,128,815 to James Guest and 3,251,236 to Ernest Wildhaber. Each of these patents show forming the profile of the basic rack as a sine curve rather than as a straight line as in the case of an involute.

From elementary gear theory it can be readily understood that the tooth profiles of all gears operating on parallel axes must obey the well!- known conjugate action law: the common normal at all points of contact must pass through a fixed point on the line of centers, called the pitch point. This is a kinematic requirement if one profile is to drive the other at a constant angular speed ratio. It can also be readily understood that a pair of gear profiles contact each other at different positions as the gears rotate. The locus of all possible contact points for a given pair of profiles is called the path of contact. This is a straight or curved line segment, terminated by the extremities of the gear teeth. The three curves involved in the most fundamental part of gear design are (1) the profile of gear No. 1; (2) the profile of gear No. 2; and (3) the path of contact.

A basic geometric fact of great significance is, that, given a fixed center distance and speed ratio, any one of these curves completely determines the other two. For example, if the profile of gear No. 1 is made some definite mathematical curve; then the profile of gear No. 2 and the path of contact are both uniquely determined. Likewise, if the path of contact is shown as some given curve, the profiles of both gears are uniquely determined. Thus it is possible to find mathematical relationships between tooth curvatures from given properties of the path of contact.

SUMMARY

It is an object of this invention to achieve a gear tooth profile which the major advantages of the involute form while eliminating most of the disadvantages.

It is a further object of this invention to determine a mathematical equation which will define the path of contact, and thus the tooth profiles, of a pair of mating gears having greatly improved strength characteristics as compared to gears with involute profiles.

It is an additional object of this invention to determine an approximate, and readily solvable, solution for a different equation defining a path of contact, and thus the tooth profiles, of a pair of mating gears which will have greatly improved strength characteristics as compared to gears having involute profiles.

These and other objects are attained by the present invention which provides for the profiles of a pair of mating conjugate gear teeth as having substantially constant relative curvature at each point of contact. The profile of the basic rack and thus the profiles of the mating gears can be determined, assuming the fixed center distance between the gears and the speed ratio is known, from the coordinates of the path of contact. Once the path of contact is known, it is a simple matter for the basic-rack profile to be determined since equations for determining the rack profile from the path of contact are well known to the gear designer (see pages 15 and 16, Buckingham, "Analytical Mechanics of Gears," McGraw-Hill Book Co. 1949).

For an involute system, the path of contact is a straight line and the relative curvature for each of its mating gears near their base circle approaches infinity. Since a large relative curvature indicates a great probability of surface failure, one can readily understand that an involute gear is weak near its base circle. The weakness problem of involute gears is emphasized even further when one considers than for involute gears having relatively few teeth (less than about 16) the teeth are undercut near their base circle. It may be seen that at the pitch contact point the relative curvature for all systems depends only on the pitch radii and the pitch pressure angle—not on the general shape of the path of contact. Thus, it would seem that to optimize a gear design, and keep the Hertz stress from exceeding its value at the pitch point, the relative curvature at every contact point should be equal to or less than that at the pitch point. There will be a minimum deviation from the involute, especially with respect to insensitivity to changes in center distance, if the tooth form has the property of constant relative curvature. The reason for trying to achieve a minimum deviation from the involute is to retain as many of its desirable properties as possible. Thus, whether the relative curvature at every point on the path of contact is slightly greater or slightly less than at the pitch point (and variations in both directions are contemplated by this invention), the advantages of the involute system with regard to insensitivity to center distance variations will be substantially maintained. Although a slight increase in the relative curvature will slightly increase the Hertz stress as compared to the case of a gear where the relative curvature is maintained exactly constant or slightly less than at the pitch point, the difference would be of relatively little significance in the performance of the gear.

By means of a differential equation which will be hereinafter set forth, and whose derivation is not necessary to an understanding of the present invention, one can obtain the solution, in terms of the polar coordinate variables $\phi$ and $s$, for the path of contact. Knowing the path of contact, as previously noted, the gear tooth and rack forms can then be determined. Since the differential equation is not linear, the solution is not easy to come by. However, one may use a procedure of approximating a solution by obtaining a series of terms. It has been found that by carrying the solution to only three terms it is in many cases possible to achieve a relative curvature which is within 1 percent of its value at the pitch point at every point on the path of contact. Even on gears having relatively few numbers of teeth, such as eight, it has been possible to achieve a relative curvature which is within 15–20 percent of its value at the pitch point. A corresponding eight-toothed involute gear would be extremely weak since it would be undercut in its base and would have a relative curvature at its extremes of contact which would be several times its value at the pitch point, leading to high Hertz stresses.

The constant relative curvature gear design gives significant advantages mainly in cases where at least one of the mating gears has a low number of teeth—say less than 22. There are many such applications, some of which are: final drives of vehicles; high ratio speed reducers; planetaries; radar pedestal drives; pump gears; parallel axis gearing; and in many sintered metal spun gear applications. Gear teeth of constant relative curvature never undercut, and have greater beam strength than involute gear teeth of the same proportions. Furthermore, these advantages are maintained even when the series solution to the differential equation is approximated by being truncated to three terms. The approximate solution is actually desirable since the relative curvature diminishes very slightly to each side of the pitch point and results in the teeth being slightly strengthened in these regions where sliding action is at a maximum.

Gears having constant (or substantially constant) relative curvature can be produced by the same processes as involute gears, at a very little increase in cost. When the gears are produced from powdered metal by sintering, the increase in production cost—occurring only in making the molds—is negligible, and the gain in strength can be quite substantial due to the limitations in effective surface hardness obtainable in powdered metal. The same holds true for plastic gears.

Where the gears are produced by hobbing, the hob is slightly more complex, having a curved instead of straight shape. However, such modifications are easy to accomplish with present-day hob-making techniques.

Where the gear teeth are finished by form grinding, as in many critical aircraft power trains, the tooth having a constant relative curvature requires only a different template, no more difficult to make than the involute.

For shaped and shaved gears, the tools at present might involve some difficulties, which, however, can be overcome with modified equipment.

BRIEF DESCRIPTION OF THE DRAWINGS

FIG. 1 is a diagram showing various dimensions of a pair of mating gears and illustrating the three basic curves fundamental to gear design;

FIG. 2 is a diagram showing polar coordinates being used to define the path of contact of a pair of mating gears;

FIG. 3 is a graph plotting relative curvature versus roll angle from pitch point for eight-tooth gears having involute and constant relative curvature profiles; and FIG. 4 is a diagram showing the tooth profile of an eight-tooth gear having constant relative curvature as compared to an involute gear.

DESCRIPTION OF THE PREFERRED EMBODIMENT

Referring to FIG. 1, the three curves fundamental to gear design may be seen. These are: $PG_1$ which is the profile of the first gear indicated generally at 1 and having a center at $C_1$ and an outside radius $RO_1$; $PG_2$ which is the profile of the second gear indicated generally at 2 and having a center at $C_2$ and an outside radius $RO_2$; and PC which is the path of contact. Other dimensions of interest on gears 1 and 2 are their center-to-center distance CD and their pitch radii, $R_1$ and $R_2$. The center-to-center distance CD is the distance between the centers $C_1$ and $C_2$ while the pitch radii $R_1$ and $R_2$ are the distances between the pitch point and the respective gear centers $C_1$ and $C_2$. As the gears 1 and 2 rotate, the tooth profile curves $PG_1$ and $PG_2$ will contact each other at different positions and the locus of all successive contact points will determine the shape of the path of contact PC.

In FIG. 2, a pair of gears 1 and 2 are illustrated in a different position than in FIG. 1 with a point of contact CP being indicated in terms of polar coordinates as being located at a distance $s$ from the pitch point PP and at an angle $\phi$ which is also the pressure angle from a horizontal line normal to the line connecting centers $C_1$ and $C_2$. The radius of curvature of the profile $PG_1$ of gear 1 is of a length $\rho_1$ while the radius of curvature of profile $PG_2$ of gear 2 is of a length $\rho_2$.

As previously noted (and assuming a fixed center distance CD and speed ratio $R_2/R_1$), any one of the curves $PG_1$, $PG_2$ and PC completely determines the other two. Thus, if the path of contact PC is shown as some given curve, the profiles $PG_1$ and $PG_2$ of gears 1 and 2 will be uniquely determined. Furthermore, it is possible to find mathematical relationships between tooth curvatures or profiles from given properties of the path of contact. These mathematical relationships form the basis for designing gears having teeth of constant relative curvature.

Referring to FIG. 2, the general formulas for tooth curvatures $\rho_1$ and $\rho_2$ as well as for relative tooth curvature $K_r$ are as follows:

$$\rho_1 = \frac{R_1 \sin \phi}{1 - R_1 \frac{d\phi}{ds} \cos \phi} - s$$

$$\rho_2 = \frac{R_2 \sin \phi}{1 + R_2 \frac{d\phi}{ds} \cos \phi} + s$$

$$K_r = \frac{1}{\rho_r} = \frac{1}{\rho_1} + \frac{1}{\rho_2}$$

$$K_r = \frac{(R_1 + R_2) \sin \phi}{\left[ R_1 \left( \sin \phi + s \frac{d\phi}{ds} \cos \phi \right) - s \right] \left[ R_2 \left( \sin \phi + s \frac{d\phi}{ds} \cos \phi \right) + s \right]}$$

$$= \frac{R_1 + R_2}{R_1 R_2} \sin \phi_p = \text{constant}$$

where:
$R_1$ = pitch radius of gear no. 1,
$R_2$ = pitch radius of gear no. 2,
$\phi_p$ = the instantaneous value of the pressure angle at the pitch contact point,
$s$, $\phi$ = are the polar coordinates of the path of contact, referred to the pitch point, with $\phi$ also being the instantaneous pressure angle at any contact point,
$\rho_1$ = radius of curvature of profile of gear no. 1,
$\rho_2$ = radius of curvature of profile of gear no. 2, $\rho_r$ = relative radius of curvature.

The preceding is a differential equation in the two variables for the polar coordinates $\phi$ and $s$, and has a solution which will give the path of contact, from which the gear tooth and rack forms can be determined. Being a nonlinear equation, the solution is not an easy one. Accordingly, it is desirable to approximate a solution by obtaining a converging series of terms. The equation for such an approximate solution, truncated to three terms is as follows;

$$\sin \phi = a_0 + a_1\sigma + a_2\sigma_2$$

where $$\sigma = s/R_1$$
$$a_0 = \sin \phi_p$$
$$a_1 = \frac{1}{3}\left(\frac{R_2 - R_1}{R_2}\right)$$
$$a_2 = \frac{1}{5 \sin \phi_p}\left(\frac{2a_1^2 + R_1}{R_2}\right)$$

The solution could of course be carried farther to obtain more terms, but from a practical standpoint additional terms are unnecessary.

FIG. 3 graphically plots a curve 5 of relative curvature $K_r$ versus roll angle from the pitch point for an eight-tooth involute gear and a similar curve 6 for an eight-tooth gear having substantially constant relative curvature (as determined from the aforementioned approximation equations). It can be readily noted that curve 6 is slightly curved down at its ends. This shape means that the Hertz stress is slightly less at the beginning and end of the tooth profile $PG_c$, a desirable property since the mating teeth are subject to more wear at the ends of their profiles where they are undergoing a sliding motion than at the pitch point where their relative motion is a rolling one. Looking at curve 5 for the involute, it is obvious that the Hertz stress is extremely high at the ends of the tooth profile. Thus, the involute teeth will be greatly weakened at these points. It can also be seen in FIG. 3 that curve 6 extends further in a horizontal direction than curve 5, an indication that teeth with constant relative curvature can be made to remain in contact for several more degrees of rotation. Such additional contact is very beneficial since it lessens the tooth loading.

In FIG. 4, a comparison between the active profile $PG_c$ of an eight-tooth gear 10 having constant relative curvature and the active profile $PG_i$ of an eight-tooth involute gear having a base circle 12 is shown. It can be readily seen that the active profile $PG_i$ of the involute tooth is much shorter and therefore much less able to offer good contact carryover from tooth to tooth.

In designing a gear system utilizing the concept of constant relative curvature disclosed herein, the designer need merely determine the approximate solution for a sufficient number of points, such as 25 for example, on the path of contact to enable the path of contact, and from it, the tooth profiles, to be determined with the accuracy desired. Where many points are to be determined it has been found extremely helpful to utilize a digital computer.

I claim:

1. A gear set comprising a pair of mating gears having external conjugate gear teeth and one of said gears having less than 30 teeth, the profile of said gear teeth having substantially constant relative curvature at all points of contact.

2. A gear set as defined in claim 1 wherein the relative curvatures of the gear teeth at all contact points is within 20 percent of its value at the pitch point.

3. A gear set as defined in claim 1 wherein the relative curvatures of the gear teeth at all contact points is within 5 percent of its value at the pitch point.

4. A gear set as defined in claim 1 wherein the relative curvatures of the gear teeth at all contact points is within 1 percent of its value at the pitch point.

5. A gear set comprising a pair of mating ears having conjugate gear teeth, the path of contact of said pair of gears being a curve substantially satisfying the differential equation:

$$K_r = \frac{(R_1 + R_2) \sin \phi}{\left[R_1\left(\sin \phi + s\frac{d\phi}{ds}\cos \phi\right) - s\right]\left[R_2\left(\sin \phi + s\frac{d\phi}{ds}\cos \phi\right) + s\right]}$$
$$= \frac{R_1 + R_2}{R_1 R_2 \sin \phi_p} = \text{constant}$$

Where:
$R_1$ = pitch radius of gear no. 1,
$R_2$ = pitch radius of gear no. 2,
$\phi_p$ = the instantaneous value of the pressure angle at the pitch contact point,
$s, \phi$ = are the polar coordinates of the path of contact, referred to the pitch point, with $\phi$ also being the instantaneous pressure angle at any contact point,
$\rho_1$ = radius of curvature of profile of gear no. 1,
$\rho_2$ = radius of curvature of profile of gear no. 2,
$\rho_r$ = relative radius of curvature,
and by definition:

$$K_r = 1/\rho_r = 1/\rho_1 + 1/\rho_2.$$

6. A gear set as defined in claim 5 wherein said path of contact corresponds to the approximate solution to said differential equation which is defined by the equation:

$$\sin \phi = a_0 + a_1\sigma + a_2\sigma^2$$

where:

$$\sigma = s/R_1$$
$$a_0 = \sin \phi_p$$
$$a_1 = \frac{1}{3}\left(\frac{R_2 - R_1}{R_2}\right)$$
$$a_2 = \frac{1}{5 \sin \phi_p}\left(\frac{2a_1^2 + R_1}{R_2}\right)$$

7. A gear cutting tool for cutting one of a set of mating gear teeth, the basic rack form of said cutting tool being derived from the equation:

$$\sin \phi = a_0 + a_1\sigma + a_2\sigma^2$$

where:

$$\sigma = s/R_1$$
$$a_0 = \sin \phi_p$$
$$a_1 = \frac{1}{3}\left(\frac{R_2 - R_1}{R_2}\right)$$
$$a_2 = \frac{1}{5 \sin \phi_p}\left(2a_1^2 + \frac{R_1}{R_2}\right)$$

$R_1$ = pitch radius of gear no. 1.
$R_2$ = pitch radius of gear no. 2.
$\phi_p$ = the instantaneous value of the pressure angle at the pitch contact point.
$s, \phi$ = are the polar coordinates of the path of contact, referred to the pitch point, and $\phi$ also being the instantaneous pressure angle at any contact point.

\* \* \* \* \*